(12) United States Patent
Jacobsen et al.

(10) Patent No.: US 7,887,968 B2
(45) Date of Patent: Feb. 15, 2011

(54) FUEL CELL CONTROL VALVE

(75) Inventors: Alan J. Jacobsen, Pacific Palisades, CA (US); Jennifer J. Zinck, Calabasas, CA (US); Leslie A. Momoda, Los Angeles, CA (US); Michael W. Murphy, Manchester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1002 days.

(21) Appl. No.: 11/688,139

(22) Filed: Mar. 19, 2007

(65) Prior Publication Data
US 2008/0233443 A1    Sep. 25, 2008

(51) Int. Cl.
*H01M 8/04* (2006.01)

(52) U.S. Cl. ................ 429/455; 429/431; 429/456; 429/512

(58) Field of Classification Search ............... None
See application file for complete search history.

(56) References Cited

U.S. PATENT DOCUMENTS

| | | | |
|---|---|---|---|
| 6,890,674 B2 * | 5/2005 | Beckmann et al. | 429/442 |
| 6,913,845 B2 * | 7/2005 | Bekkedahl et al. | 429/429 |
| 7,309,022 B2 * | 12/2007 | Nakakubo | 236/93 A |
| 2005/0202291 A1 * | 9/2005 | Schweizer | 429/13 |
| 2005/0266295 A1 * | 12/2005 | Takai | 429/38 |
| 2007/0037034 A1 * | 2/2007 | Fisher et al. | 429/34 |

* cited by examiner

*Primary Examiner*—Patrick Ryan
*Assistant Examiner*—Cynthia Lee
(74) *Attorney, Agent, or Firm*—John A. Miller; Miller IP Group, PLC

(57) ABSTRACT

A flow control valve for a fuel cell that has particular application for controlling the flow of cathode air through a cathode flow channel of the fuel cell. The valve includes an element that controls the flow through the flow channel in response to changes in the voltage potential of the fuel cell. The valve includes a shape memory alloy wire and a flow control element secured to both ends of the shape memory alloy wire. The ends of the wire are also coupled to the anode and cathode of the fuel cell. When no current is flowing through the wire, the flow control element holds the wire in a pre-strained condition. If the voltage generated by the fuel cell increases, the current passing through the wire will heat the wire and cause it to shrink or contract which forces the flow control element into the flow path.

21 Claims, 3 Drawing Sheets

FUEL CELL CONTROL VALVE

BACKGROUND OF THE INVENTION

1. Field of the Invention

This invention relates generally to a control valve positioned within a flow channel of a fuel cell and, more particularly, to a control valve positioned with a flow channel of a fuel cell, such as a cathode flow channel, that controls the flow of a gas or liquid through the flow channel in response to changes in the voltage of the fuel cell.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA).

Several fuel cells are typically combined in a fuel cell stack to generate the desired power. For the automotive fuel cell stack mentioned above, the stack may include two hundred or more fuel cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

As is well understood in the art, the membranes within a fuel cell need to have a certain relative humidity so that the ionic resistance across the membrane is low enough to effectively conduct protons. During operation of the fuel cell, moisture from the MEAs and external humidification may enter the anode and cathode flow channels. At low cell power demands, typically below 0.2 A/cm$^2$, the water may accumulate within the flow channels because the flow rate of the reactant gas is too low to force the water out of the channels. As the water accumulates, it forms droplets that continue to expand because of the relatively hydrophobic nature of the plate material. The droplets form in the flow channels substantially perpendicular to the flow of the reactant gas. As the size of the droplets increases, the flow channel is closed off, and the reactant gas is diverted to other flow channels because the channels are in parallel between common inlet and outlet manifolds. Because the reactant gas may not flow through a channel that is blocked with water, the reactant gas cannot force the water out of the channel. Those areas of the membrane that do not receive reactant gas as a result of the channel being blocked will not generate electricity, thus resulting in a non-homogenous current distribution and reducing the overall efficiency of the fuel cell. As more and more flow channels are blocked by water, the electricity produced by the fuel cell decreases, where a cell voltage potential less than 200 mV is considered a cell failure. Because the fuel cells are electrically coupled in series, if one of the fuel cells stops performing, the entire fuel cell stack may stop performing.

It is usually possible to purge the accumulated water in the flow channels by periodically forcing the reactant gas through the flow channels at a higher flow rate. However, on the cathode side, this increases the parasitic power applied to the air compressor, thereby reducing overall system efficiency. Moreover, there are many reasons not to use the hydrogen fuel as a purge gas, including reduced economy, reduced system efficiency and increased system complexity for treating elevated concentrations of hydrogen in the exhaust gas stream.

Reducing accumulated water in the channels can also be accomplished by reducing inlet humidification. However, it is desirable to provide some relative humidity in the anode and cathode reactant gases so that the membrane in the fuel cells remains hydrated. A dry inlet gas has a drying effect on the membrane that could increase the cell's ionic resistance, and limit the membrane's long-term durability.

One concern for a fuel cell is referred to as oxidant starvation, where the cathode side of the fuel cell does not receive the necessary oxidant, especially when diluted oxygen is used, such as air. This concern is particularly troublesome in automotive applications where the current density drawn from the fuel cell stack can vary greatly. If oxidant starvation occurs in one fuel cell, it may decrease that cell's voltage, which in turn, may limit the performance of the entire stack. One known way for addressing this concern is to flow excess oxidant to the stack, which reduces the overall efficiency of the fuel cell system.

It is known in the art to use control valves to control the flow of cathode oxidant, anode hydrogen and cooling fluid to the fuel cell stack. However, the known control valves typically control the flow to the stack itself, and not the fuel cells individually. Therefore, the individual flow channels in the fuel cells cannot be separately purged of water. Because of this, there is sometimes an increased flow to those fuel cells that don't require the excess flow, such as for channel purging or oxidant starvation. Conventional valve technology exists that could control the flow of oxidant, reactant or coolant to the individual fuel cells in the fuel cell stack. However, the complexity involved in implementing such conventional technology would easily negate any added benefit to the system.

SUMMARY OF THE INVENTION

In accordance with the teachings of the present invention, a flow control valve for a fuel cell is disclosed that has particular application for controlling the flow of cathode air through a cathode flow channel of the fuel cell. The valve includes an element that controls the flow through the flow channel in response to changes in the voltage potential of the fuel cell. In one embodiment, the valve includes a shape memory alloy element and a flow control element secured to both ends of the shape memory alloy element. The ends of the shape memory alloy element are also coupled to the anode and cathode of the fuel cell. When no current is flowing through the shape memory alloy element, the flow control element holds the shape memory alloy element in a pre-strained condition, where the flow through the channel is the greatest. If the voltage generated by the fuel cell increases, the current passing through the shape memory alloy element will heat the shape memory alloy element and cause it to shrink or contract which forces the flow control element into the flow path, thus reducing the flow.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a flow control valve for controlling flow through flow channels in a fuel cell is merely exemplary in nature, and is in no way intended to limit the invention or its applications or uses.

Figure 1:
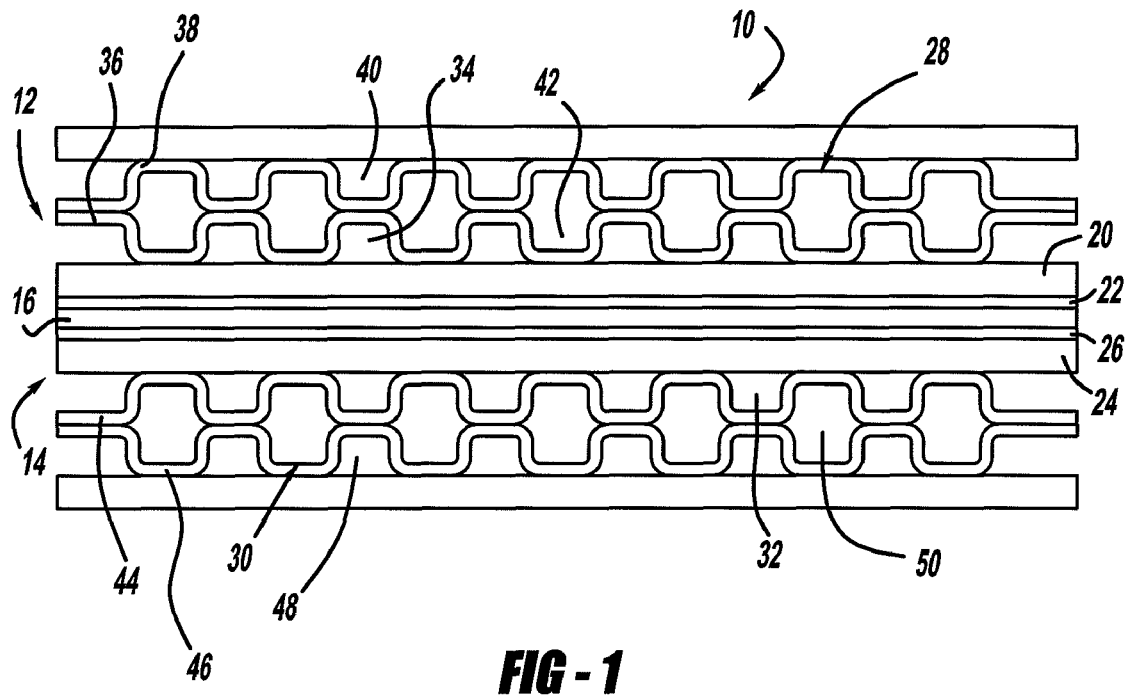
FIG. 1 is a cross-sectional view of a fuel cell in a fuel cell stack.

FIG. 1 is a cross-sectional view of a fuel cell 10 that is part of a fuel cell stack of the type discussed above. The fuel cell 10 includes a cathode side 12 and an anode side 14 separated by a perfluorosulfonic acid membrane 16. A cathode side diffusion media layer 20 is provided on the cathode side 12, and a cathode side catalyst layer 22 is provided between the membrane 16 and the diffusion media layer 20. Likewise, an anode side diffusion media layer 24 is provided on the anode side 14, and an anode side catalyst layer 26 is provided between the membrane 16 and the diffusion media layer 24. The catalyst layers 22 and 26 and the membrane 16 define an MEA. The diffusion media layers 20 and 24 are porous layers that provide for input gas transport to and water transport from the MEA. Various techniques are known in the art for depositing the catalyst layers 22 and 26 on the diffusion media layers 20 and 24, respectively, or on the membrane 16.

A cathode side flow field plate or bipolar plate 28 is provided on the cathode side 12 and an anode side flow field plate or bipolar plate 30 is provided on the anode side 14. The bipolar plates 28 and 30 are provided between the fuel cells in the fuel cell stack. A hydrogen reactant gas flow from flow channels 32 in the bipolar plate 30 reacts with the catalyst layer 26 to dissociate the hydrogen ions and the electrons. Airflow from flow channels 34 in the bipolar plate 28 reacts with the catalyst layer 22. The hydrogen ions are able to propagate through the membrane 16 where they carry the ionic current through the membrane. The by-product of this electrochemical reaction is water.

In this non-limiting embodiment, the bipolar plate 28 includes two sheets 36 and 38 that are formed separately and then joined together. The sheet 38 defines the flow channels 34 and the sheet 36 defines flow channels 40 for the anode side of an adjacent fuel cell to the fuel cell 10. Cooling fluid flow channels 42 are provided between the sheets 36 and 38, as shown. Likewise, the bipolar plate 30 includes a sheet 44 defining the flow channels 30, a sheet 46 defining flow channels 48 for the cathode side of an adjacent fuel cell, and cooling fluid flow channels 50. In the embodiments discussed herein, the sheets 36, 38, 44 and 46 are made of an electrically conductive material, such as stainless steel, titanium, aluminum, polymeric carbon composites, etc.

Figure 2:
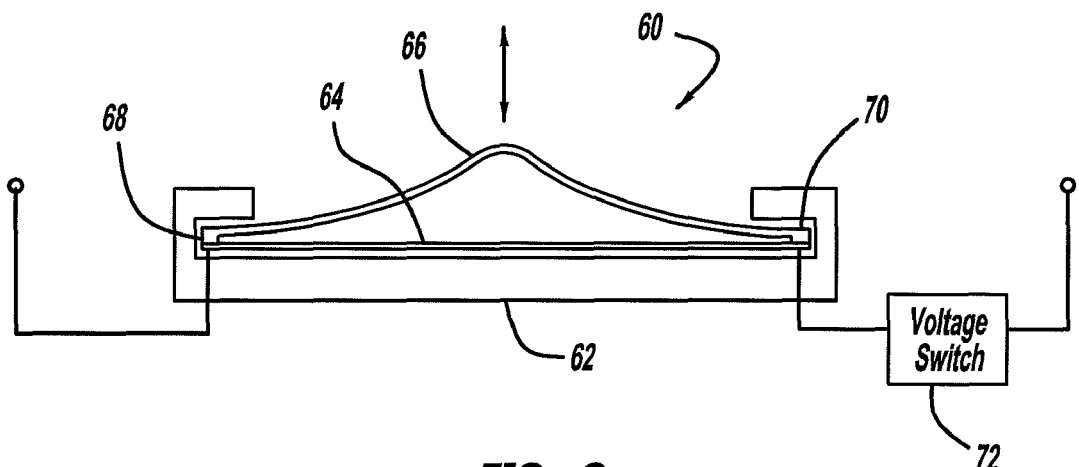
FIG. 2 is a plan view of a flow control valve for controlling the flow of a gas or fluid through a flow channel in a fuel cell, where the control valve employs a shape memory alloy element, according to an embodiment of the present invention.

FIG. 2 is a side plan view of a flow control valve 60 for use in a flow channel in a fuel cell, according to an embodiment of the present invention. The flow control valve 60 has particular application for controlling the flow of cathode air through the cathode flow channels. However, as will be appreciated by those skilled in the art, the flow control valve 60 may also have application for controlling the flow through the anode flow channels in the fuel cell and the cooling fluid flow channels in the fuel cell.

The flow control valve 60 includes a valve housing 62 and a straight shape memory alloy (SMA) wire 64 positioned within the housing 62. An electrically insulating flow control element 66, having a leaf spring type shape in this non-limiting embodiment, is coupled to the ends of the SMA wire 64. The valve housing 62 and the flow control element 66 can be made of any material suitable for the purposes described herein and the fuel cell environment, such as stainless steel for the housing 62 and a non-conductive material for the element 66. The SMA wire 64 is made of a suitable shape memory alloy, several of which are known in the art. In one non-limiting embodiment, the alloy is about 50% nickel and about 50% titanium. As is well known to those skilled in the art, a shape memory alloy can be stretched, within limits, where it will return to its pre-stretched shape. By applying heat to the shape memory alloy after it has been stretched, the shape memory alloy goes through a phase transition that causes it to return to its relaxed position under significant force. The wire 64 can be made inexpensively, and be small enough for the size of the flow channels being discussed herein. In one non-limiting embodiment, the wire 64 is stretched in the range of 1-4% of its un-stretched size. The wire 64 can be secured to the ends of the element 66 by any suitable technique, such as welding or a mechanical coupler.

The element 66 has a bent shape, as shown, for reasons that will become apparent from the discussion below. One end 68 of the SMA wire 64 is electrically coupled to the anode conductor of the fuel cell and an opposite end 70 of the SMA wire 64 is electrically coupled to the cathode conductor of the fuel cell through a voltage switch 72. At least one of the ends 68 or 70 is allowed to move laterally within the valve housing 62. Current flowing through the wire 64 from the fuel cell voltage potential will heat the wire 64 and cause it to shrink or contract. Particularly, the heat will cause the orientation of the atoms in the alloy to change, which will cause the alloy to return to its original size. By using the voltage switch 72 as discussed herein, actuation of the flow control element 66 is passive in that it responds to changes in the voltage of the fuel cell.

Figure 3:
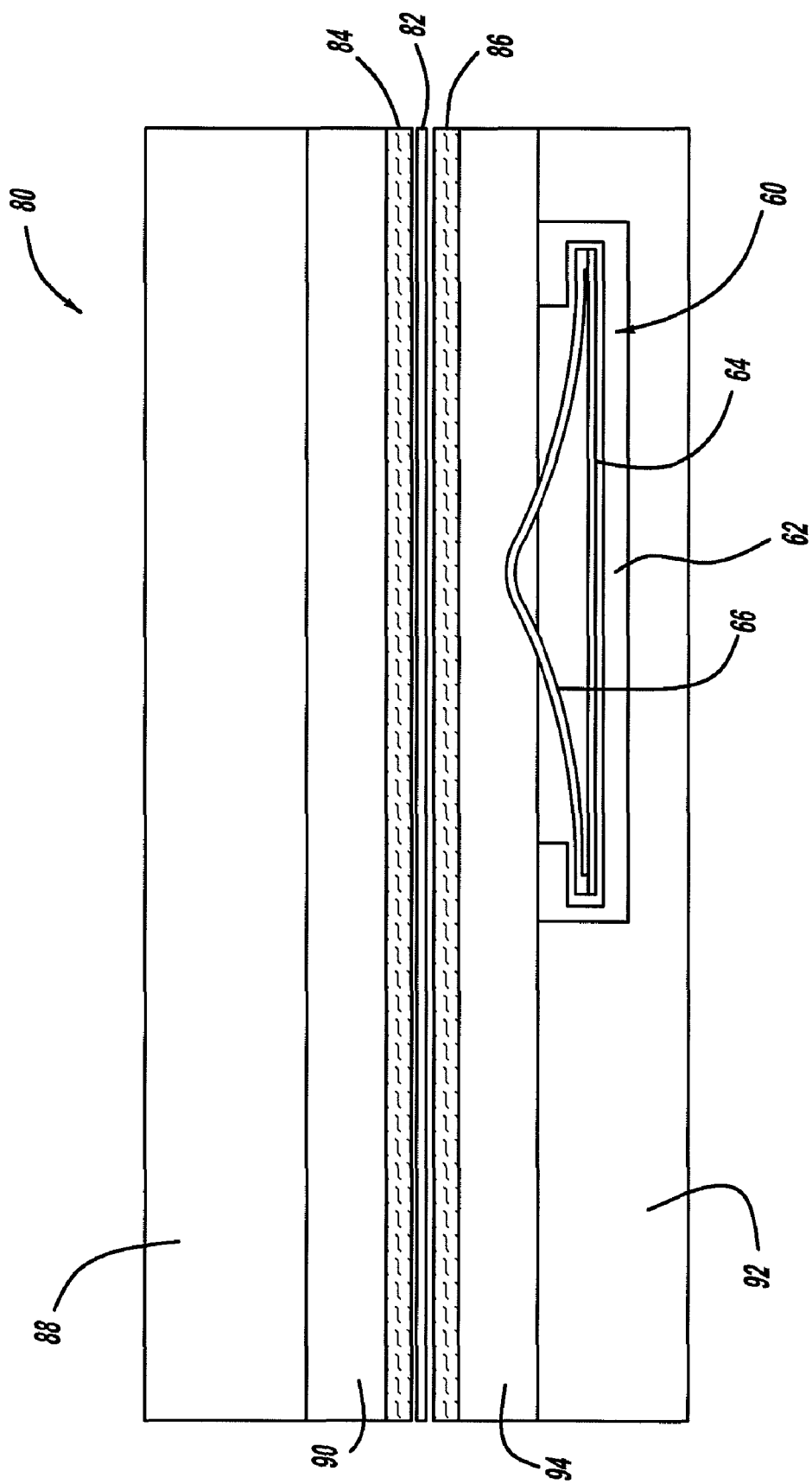
FIG. 3 is a cross-sectional view of a fuel cell including the flow control valve shown in FIG. 2.

FIG. 3 is a cross-sectional view of a fuel cell 80 including an MEA 82, an anode side diffusion media layer 84 and a cathode side diffusion media layer 86. An anode side bipolar plate 88 including an anode side reactant gas flow channel 90 is provided adjacent to the diffusion media layer 84 and a cathode side bipolar plate 92 including a cathode flow channel 94 is provided adjacent to the diffusion media layer 86. A portion of the cathode side bipolar plate 92 is cut out, and the flow control valve 60 is positioned in the cut out portion, as shown. The flow control element 66 has the shape as shown, and would extend nearly completely across the width of the flow channel 94. The wire 64 may be a cylindrical wire coupled to a suitable location along the width of the element 66. The thickness of the flow control element 66 and the diameter of the wire 64 would be calibrated for the particular application. In an alternate embodiment, the wire 64 may be a ribbon type device that also has a planar configuration.

When the fuel cell voltage is low and the voltage switch 72 is open, the SMA wire 64 is in its expanded pre-strained configuration, and the flow control element 66 does not significantly block the cathode flow channel 94. Thus, the maximum amount of flow can flow through the flow channel 94. If the voltage of the fuel cell 80 increases beyond a predetermined value that causes the voltage switch 72 to close, current will flow through the SMA wire 64 and cause it to be heated. When the wire 64 is heated beyond its transition temperature, the SMA wire 64 will actuate, or recover its pre-strained length, i.e., shrink or contract. As the SMA wire 64 shrinks, the flow control element 66 is forced upward, restricting the airflow through the cathode flow channel 94. Under normal operating conditions, the fuel cell 80 produces enough voltage to close the switch 72 and actuate the SMA wire 64 where the flow control element 66 restricts the air to the cathode side of the fuel cell 80. If the voltage of the fuel cell 80 drops, possibly because of water accumulation within the flow channel 94, the current passing through the SMA wire 64 will decrease and the switch 72 will open, thus allowing the wire 64 to cool below its transition temperature. As the SMA wire 64 unactuates, the elastic energy stored in the flow control element 66 forces it back to its original position while restraining the SMA wire 64. With the flow control element 66 in this position, airflow through the cathode flow channel 94 will increase, which will help correct for oxygen starvation and flooding problems. This will help the fuel cell voltage recover above the threshold voltage, and as it does, the SMA wire 64 will reactuate and the flow control element 66 will again restrict the airflow.

Figure 4:
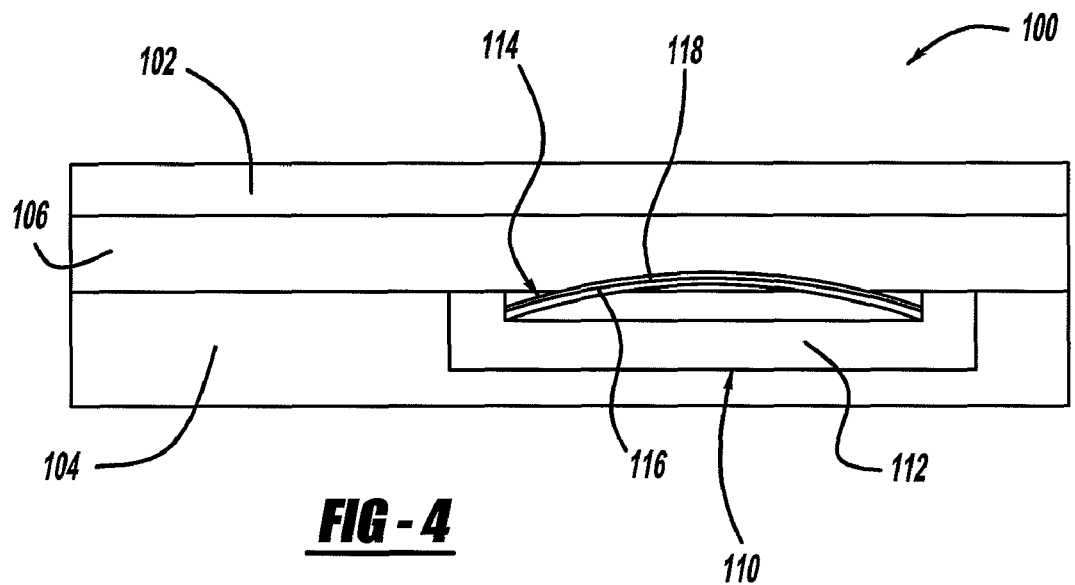
FIG. 4 is a cross-sectional view of a fuel cell including a flow control valve employing an electro-active polymer as part of a bi-layer element, according to another embodiment of the invention.

FIG. 4 is a cross-sectional view of a cathode side of a fuel cell 100 including a diffusion media layer 102, a flow field plate 104 and a flow channel 106 therebetween. The fuel cell 100 also includes a flow control valve 110 including a valve housing 112 and a bi-layer element 114. The ends of the bi-layer element 114 are electrically coupled to the fuel cell 100 in the same manner as discussed above. The bi-layer element 114 includes a polymer substrate layer 116 and an electro-active polymer (EAP) layer 118. A voltage potential across the bi-layer element 114 will cause the electro-active polymer layer 118 to expand in proportion thereto, but will not have an effect on the substrate layer 116. Therefore, the bi-layer element 114 bends into the flow channel 106 in response to the voltage potential, reducing the flow through the flow channel 106. Thus, normal operation of the fuel cell 100 when the cell voltage potential is generally high will reduce the flow through the flow channel 106, and a low cell voltage, such as from cell flooding, will increase the flow through the flow channel 106. Electro-active polymers that operate in this manner are well known to those skilled in the art.

Figure 5:
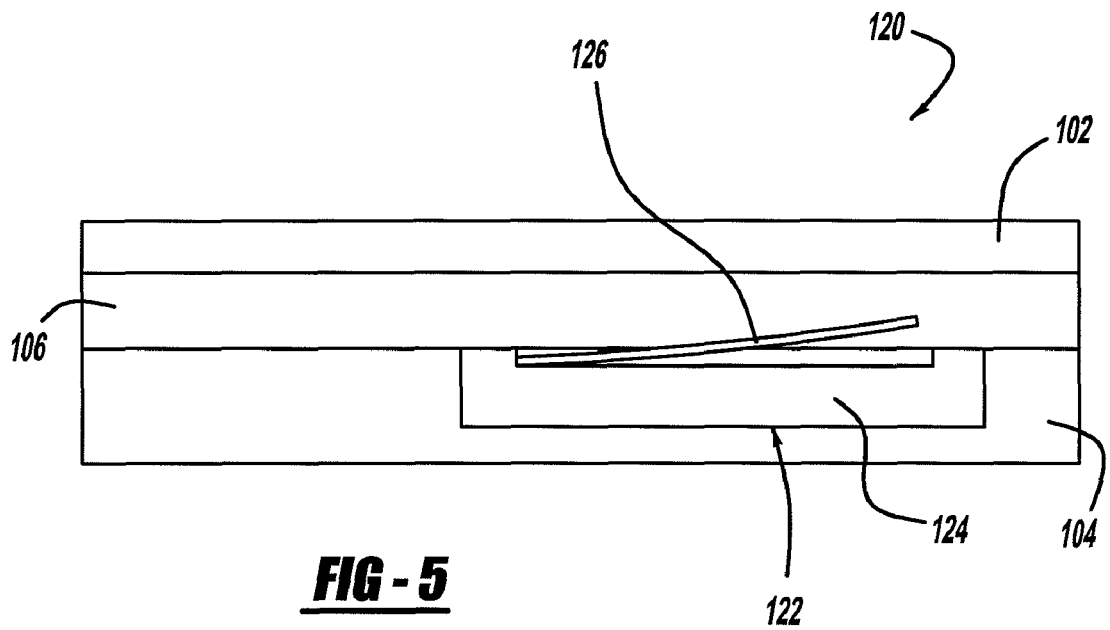
FIG. 5 is a cross-sectional view of a fuel cell including a flow control valve employing a bending electro-active polymer element, according to another embodiment of the present invention.

FIG. 5 is a cross-sectional view of a fuel cell 120 similar to the fuel cell 100, where like elements are identified by the same reference numeral. In this embodiment, the flow control valve 110 is replaced with a flow control valve 122 including a valve housing 124 and a bending electro-active polymer (EAP) element 126 that bends in response to voltage stimulation. As shown, the element 126 is connected to the housing at one end, and is free at the other end. In this embodiment, the substrate layer 116 is not used because the EAP element 126 has characteristics that cause it to curl or bend in response to a voltage potential. Thus, normal operation of the fuel cell 120 when the cell voltage potential is generally high will reduce the flow through the flow channel 106, and a low cell voltage, such as from cell flooding, will increase the flow through the flow channel 106. As is well understood in the art, different electro-active polymers perform in different manners. As with the SMA wire, the electro-active polymers can be made small enough and still be effective in the flow control through fuel cell flow channels.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A flow control valve for controlling flow through a flow channel in a fuel cell, said fuel cell including an anode side and a cathode side, said valve comprising:
    a shape memory alloy element including a first end and a second end; and
    an electrically insulating flow control element including a first end and a second end, said first end of the flow control element being coupled to the first end of the memory alloy element and said second end of the flow control element being coupled to the second end of the memory alloy element, said flow control element extending into the flow channel, wherein a current flow through the shape memory alloy element causes the length of the memory alloy element to change, which causes the flow control element to change the flow through the flow channel.

2. The valve according to claim 1 wherein the memory alloy element is held in a pre-strained position by the flow control element when no current is flowing through the memory alloy element.

3. The valve according to claim 2 wherein a current flow through the memory alloy element causes the memory alloy element to contract to its unstrained position and cause the flow control element to reduce the flow through the flow channel.

4. The valve according to claim 2 wherein the pre-strained position is in the range of 1-4% of the non-strained length of the memory alloy element.

5. The valve according to claim 1 wherein the first end of the memory alloy element is electrically coupled to the anode side of the fuel cell and the second end of the memory alloy element is electrically coupled to the cathode side of the fuel cell, wherein the voltage potential across the fuel cell generates the current flow through the memory alloy element to control the position of the flow control element.

6. The valve according to claim 5 further comprising a voltage switch electrically coupled to the memory alloy element and the fuel cell, said voltage switch switching on to allow current to flow through the memory alloy element if the voltage potential across the fuel cell goes above a predetermined value.

7. The valve according to claim 1 wherein the flow channel is a cathode flow channel.

8. The valve according to claim 1 wherein the memory alloy element is a wire.

9. The valve according to claim 1 wherein the alloy in the memory alloy element is about 50% nickel and about 50% titanium.

10. The valve according to claim 1 wherein the flow control element has a leaf-spring type configuration.

11. A flow control valve for controlling flow through a flow channel in a fuel cell, said valve being positioned adjacent to the flow channel, said valve comprising an actuation element, said actuation element being electrically actuated so as to be selectively positioned within the flow channel and control the flow through the flow channel, said valve further comprising a shape memory alloy element coupled to the actuation element, said memory alloy element being pre-strained by the actuation element, and being responsive to a current flow that causes the memory alloy element to return to its unstrained configuration and position the actuation element in the flow channel.

12. The valve according to claim 11 wherein the actuation element is a bi-layer element including a substrate layer and an electro-active polymer layer, wherein a voltage potential across the electro-active polymer layer causes the bi-layer element to bend and change the flow through the flow channel.

13. The valve according to claim 11 wherein the actuation element is an electro-active polymer element that bends in response to a voltage potential.

14. A flow control valve for controlling flow through a cathode flow channel in a fuel cell, said fuel cell including an anode side and a cathode side, said valve comprising:
  a valve housing positioned adjacent to the flow channel; and
  a valve element positioned within the housing and including a first end and a second end, said first end of the valve element being electrically coupled to the anode side of the fuel cell and said second end of the valve element being electrically coupled to the cathode side of the fuel cell, wherein a voltage potential across the fuel cell causes the valve element to extend into the flow channel to reduce the flow therethrough.

15. The valve according to claim 14 wherein the valve element includes a shape memory allow element and a flow control element, said memory alloy element being held in a pre-strained position by the flow control element when no current is flowing through the memory alloy element.

16. The valve according to claim 15 wherein a current flow through the memory alloy element causes the memory alloy element to contract to its unstrained position and cause the flow control element to reduce the flow through the flow channel.

17. The valve according to claim 14 wherein the valve element is a bi-layer element including a substrate layer and an electro-active polymer layer, wherein a voltage potential across the electro-active polymer layer causes the bi-layer element to bend and change the flow through the flow channel.

18. The valve according to claim 14 wherein the valve element is an electro-active polymer element that bends in response to a voltage potential.

19. The valve according to claim 14 further comprising a voltage switch electrically coupled to the valve element and the fuel cell, said voltage switch switching on to electrically couple the valve element to the fuel cell if the voltage potential across the fuel cell goes above a predetermined value.

20. A flow control valve for controlling flow through a flow channel in a fuel cell, said valve being positioned adjacent to the flow channel, said valve comprising an actuation element, said actuation element being electrically actuated so as to be selectively positioned within the flow channel and control the flow through the flow channel, wherein the actuation element is a bi-layer element including a substrate layer and an electro-active polymer layer, and wherein a voltage potential across the electro-active polymer layer causes the bi-layer element to bend and change the flow through the flow channel.

21. A flow control valve for controlling flow through a flow channel in a fuel cell, said valve being positioned adjacent to the flow channel, said valve comprising an actuation element, said actuation element being electrically actuated so as to be selectively positioned within the flow channel and control the flow through the flow channel, wherein the actuation element is an electro-active polymer element that bends in response to a voltage potential.

* * * * *